United States Patent
Kozinsky et al.

(10) Patent No.: US 9,401,511 B2
(45) Date of Patent: Jul. 26, 2016

(54) METAL/OXYGEN BATTERY WITH MODIFIED ELECTRODE

(71) Applicant: Robert Bosch GmbH, Stuttgart (DE)

(72) Inventors: Boris Kozinsky, Waban, MA (US); John F. Christensen, Mountain View, CA (US); Paul Albertus, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 335 days.

(21) Appl. No.: 13/960,901

(22) Filed: Aug. 7, 2013

(65) Prior Publication Data

US 2014/0045079 A1 Feb. 13, 2014

Related U.S. Application Data

(60) Provisional application No. 61/680,890, filed on Aug. 8, 2012.

(51) Int. Cl.
*H01M 4/86* (2006.01)
*H01M 12/08* (2006.01)

(52) U.S. Cl.
CPC .............. *H01M 4/8615* (2013.01); *H01M 4/86* (2013.01); *H01M 12/08* (2013.01); *Y02E 60/50* (2013.01)

(58) Field of Classification Search
CPC ....... H01M 2/08; H01M 4/86; H01M 4/8615; Y02E 60/50
USPC ......................................................... 429/405
See application file for complete search history.

(56) References Cited

U.S. PATENT DOCUMENTS

| | | | |
|---|---|---|---|
| 2006/0019167 A1* | 1/2006 | Li | 429/233 |
| 2008/0286635 A1* | 11/2008 | Seino et al. | 429/94 |
| 2010/0143807 A1 | 6/2010 | Khasin et al. | |
| 2012/0321959 A1* | 12/2012 | Yushin et al. | 429/225 |
| 2014/0113197 A1* | 4/2014 | Xiao et al. | 429/223 |

OTHER PUBLICATIONS

Abraham et al., "A polymer electrolyte-based rechargeable lithium/oxygen battery", Journal of the Electrochemical Society; 1996; pp. 1-5; vol. 143, No. 1; Norwood, USA (5 pages).
Amatucci et al., "Flouride based electrode materials for advanced energy storage devices," Journal of Flourine Chemistry; 2007; pp. 243-262; vol. 128, No. 4; Elsevier; North Brunswick, USA (20 pages).
Beattie et al., "High-Capacity Lithium-Air Cathodes", Journal of the Electrochemical Society; 2008; vol. 156; Canada (13 pages).
Cabana et al., "Beyond Intercalation-Based Li-Ion Batteries: The State of the Art and Challenges of Electrode Materials Reacting Through Conversion Reactions", Advanced Materials; 2010; pp. E170-E192; vol. 22, No. 35; Wiley; Europe (23 pages).

(Continued)

*Primary Examiner* — Jonathan Jelsma
*Assistant Examiner* — Rashid Alam
(74) *Attorney, Agent, or Firm* — Maginot Moore & Beck LLP

(57) ABSTRACT

In one embodiment, a metal/oxygen electrochemical cell includes a negative electrode, a separator positioned adjacent to the negative electrode, a positive electrode spaced apart from the negative electrode by the separator, the positive electrode including a porous electrically conductive material portion, the porous electrically conductive material portion coated with a conformally coated protective layer, and an electrolyte within the porous electrically conductive material portion.

14 Claims, 5 Drawing Sheets

(56) References Cited

OTHER PUBLICATIONS

Kumar et al., "A Solid-State, Rechargeable, Long Cycle Life Lithium-Air Battery", Journal of the Electrochemical Society; 2010; pp. A50-A54; vol. 157, No. 1; Needham, USA (5 pages).

Ogasawara et al., "Rechargeable Li2O2 Electrode for Lithium Batteries", Journal of the American Chemical Society; 2006; pp. 1390-1393; vol. 128, No. 4; Switzerland (4 pages).

Read, "Characterization of the Lithium/Oxygen Organic Electrolyte Battery," Journal of the Electrochemical Society; 2002; pp. A1190-A1195; vol. 149; Army Research Laboratory, Adelphi, USA (6 pages).

Read et al, "Oxygen Transport Properties of Organic Electrolytes and Performance of Lithium/Oxygen Battery", Journal of the Electrochemical Society; 2003; pp. A1351-A1356; vol. 150, No. 10; Army Research Laboratory, Adelphi, USA (6 pages).

USABC Goals for Advanced Batteries (1 page).

Yang et al., "The effect of oxygen pressures on the electrochemical profile of lithium/oxygen battery", Journal of Solid State Electrochemistry; 2010; pp. 109-114; Springer-Verlag; China (6 pages).

Zheng et al., "Theoretical Energy Density of Li-Air Batteries", Journal of the Electrochemical Society; 2008; pp. A432-A437; vol. 155, No. 6; USA (6 pages).

Christensen et al., "A Critical Review of Li/air Batteries," Journal of the Electrochemical Society; 2012; vol. 159(2) R1-R30, USA (30 pages).

Hutchings et al., "Electrochemical oxygen separation and compression using planar cosintered ceramics," Solid State Ionics; 2008; vol. 179 pp. 442-450, Salt lake City, USA (8 pages).

Riley et al., "Conformal Surface Coatings to Enable High Volume Expansion Li-Ion Anode Materials," ChemPhysChem; 2010; vol. 11 pp. 2124-2130, Weinheim Germany (8 pages).

Leung et al. "Using atomic layer deposition to hinder solvent decomposition in lithium ion batteries: first principles modeling and experimental studies," Journal of the American Chemical Society, 2011, vol. 133(37) pp. 14741-14754, USA (40 pages).

International Search Report and Written Opinion corresponding to PCT Application No. PCT/US2013/054006, mailed Nov. 6, 2013 (9 pages), Aug. 7, 2013.

* cited by examiner

METAL/OXYGEN BATTERY WITH MODIFIED ELECTRODE

This application claims the benefit of U.S. Provisional Application No. 61/680,890 filed Aug. 8, 2012, the entire contents of which is herein incorporated by reference.

TECHNICAL FIELD

This disclosure relates to batteries and more particularly to metal/oxygen based batteries.

BACKGROUND

Rechargeable lithium-ion batteries are attractive energy storage systems for portable electronics and electric and hybrid-electric vehicles because of their high specific energy compared to other electrochemical energy storage devices. As discussed more fully below, a typical Li-ion cell contains a negative electrode, a positive electrode, and a separator region between the negative and positive electrodes. Both electrodes contain active materials that insert or react with lithium reversibly. In some cases the negative electrode may include lithium metal, which can be electrochemically dissolved and deposited reversibly. The separator contains an electrolyte with a lithium cation, and serves as a physical barrier between the electrodes such that none of the electrodes are electronically connected within the cell.

Typically, during charging, there is generation of electrons at the positive electrode and consumption of an equal amount of electrons at the negative electrode, and these electrons are transferred via an external circuit. In the ideal charging of the cell, these electrons are generated at the positive electrode because there is extraction via oxidation of lithium ions from the active material of the positive electrode, and the electrons are consumed at the negative electrode because there is reduction of lithium ions into the active material of the negative electrode. During discharging, the exact opposite reactions occur.

When high-specific-capacity negative electrodes such as a metal are used in a battery, the maximum benefit of the capacity increase over conventional systems is realized when a high-capacity positive electrode active material is also used. For example, conventional lithium-intercalating oxides (e.g., $LiCoO_2$, $LiNi_{0.8}Co_{0.15}Al_{0.05}O_2$, $Li_{1.1}Ni_{0.3}Co_{0.3}Mn_{0.3}O_2$) are typically limited to a theoretical capacity of ~280 mAh/g (based on the mass of the lithiated oxide) and a practical capacity of 180 to 250 mAh/g, which is quite low compared to the specific capacity of lithium metal, 3863 mAh/g. The highest theoretical capacity achievable for a lithium-ion positive electrode is 1794 mAh/g (based on the mass of the lithiated material), for Li2O. Other high-capacity materials include $BiF_3$ (303 mAh/g, lithiated), $FeF_3$ (712 mAh/g, lithiated), and others. Unfortunately, all of these materials react with lithium at a lower voltage compared to conventional oxide positive electrodes, hence limiting the theoretical specific energy. Nonetheless, the theoretical specific energies are still very high (>800 Wh/kg, compared to a maximum of ~500 Wh/kg for a cell with lithium negative and conventional oxide positive electrodes, which may enable an electric vehicle to approach a range of 300 miles or more on a single charge.

FIG. 1 depicts a chart 10 showing the range achievable for a vehicle using battery packs of different specific energies versus the weight of the battery pack. In the chart 10, the specific energies are for an entire cell, including cell packaging weight, assuming a 50% weight increase for forming a battery pack from a particular set of cells. The U.S. Department of Energy has established a weight limit of 200 kg for a battery pack that is located within a vehicle. Accordingly, only a battery pack with about 600 Wh/kg or more can achieve a range of 300 miles.

Various lithium-based chemistries have been investigated for use in various applications including in vehicles. FIG. 2 depicts a chart 20 which identifies the specific energy and energy density of various lithium-based chemistries. In the chart 20, only the weight of the active materials, current collectors, binders, separator, and other inert material of the battery cells are included. The packaging weight, such as tabs, the cell can, etc., are not included. As is evident from the chart 20, lithium/oxygen batteries, even allowing for packaging weight, are capable of providing a specific energy >600 Wh/kg and thus have the potential to enable driving ranges of electric vehicles of more than 300 miles without recharging, at a similar cost to typical lithium ion batteries. While lithium/oxygen cells have been demonstrated in controlled laboratory environments, a number of issues remain before full commercial introduction of a lithium/oxygen cell is viable as discussed further below.

A typical lithium/oxygen electrochemical cell 50 is depicted in FIG. 3. The cell 50 includes a negative electrode 52, a positive electrode 54, a porous separator 56, and a current collector 58. The negative electrode 52 is typically metallic lithium. The positive electrode 54 includes electrode particles such as particles 60 possibly coated in a catalyst material (such as Au or Pt) and suspended in a porous, electrically conductive matrix 62. An electrolyte solution 64 containing a salt such as $LiPF_6$ dissolved in an organic solvent such as dimethyl ether or $CH_3CN$ permeates both the porous separator 56 and the positive electrode 54. The $LiPF_6$ provides the electrolyte with an adequate conductivity which reduces the internal electrical resistance of the cell 50 to allow a high power.

A portion of the positive electrode 52 is enclosed by a barrier 66. The barrier 66 in FIG. 3 is configured to allow oxygen from an external source 68 to enter the positive electrode 54 while filtering undesired components such as gases and fluids. The wetting properties of the positive electrode 54 prevent the electrolyte 64 from leaking out of the positive electrode 54. Alternatively, the removal of contaminants from an external source of oxygen, and the retention of cell components such as volatile electrolyte, may be carried out separately from the individual cells. Oxygen from the external source 68 enters the positive electrode 54 through the barrier 66 while the cell 50 discharges and oxygen exits the positive electrode 54 through the barrier 66 as the cell 50 is charged. In operation, as the cell 50 discharges, oxygen and lithium ions are believed to combine to form a discharge product $Li_2O_2$ or $Li_2O$ in accordance with the following relationship:

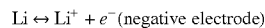

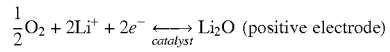

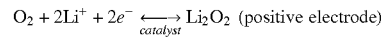

The positive electrode 54 in a typical cell 50 is a lightweight, electrically conductive material which has a porosity of greater than 80% to allow the formation and deposition/storage of $Li_2O_2$ in the cathode volume. The ability to deposit the $Li_2O_2$ directly determines the maximum capacity of the cell. In order to realize a battery system with a specific energy of 600 Wh/kg or greater, a plate with a thickness of 100 μm must have a capacity of about 20 mAh/cm$^2$.

Materials which provide the needed porosity include carbon black, graphite, carbon fibers, carbon nanotubes, and other non-carbon materials. There is evidence that each of these carbon structures undergo an oxidation process during charging of the cell, due at least in part to the harsh environment in the cell (pure oxygen, superoxide and peroxide ions, formation of solid lithium peroxide on the cathode surface, and electrochemical oxidation potentials of >3V (vs. Li/Li$^+$)).

A number of investigations into the problems associated with Li-oxygen batteries have been conducted as reported, for example, by Beattie, S., D. Manolescu, and S. Blair, "High-Capacity Lithium—Air Cathodes," *Journal of the Electrochemical Society*, 2009. 156: p. A44, Kumar, B., et al., "A Solid-State, Rechargeable, Long Cycle Life Lithium—Air Battery," *Journal of the Electrochemical Society*, 2010. 157: p. A50, Read, J., "Characterization of the lithium/oxygen organic electrolyte battery," *Journal of the Electrochemical Society*, 2002. 149: p. A1190, Read, J., et al., "Oxygen transport properties of organic electrolytes and performance of lithium/oxygen battery," *Journal of the Electrochemical Society*, 2003. 150: p. A1351, Yang, X and Y. Xia, "The effect of oxygen pressures on the electrochemical profile of lithium/oxygen battery," *Journal of Solid State Electrochemistry:* p. 1-6, and Ogasawara, T., et al., "Rechargeable Li$_2$O$_2$ Electrode for Lithium Batteries," *Journal of the American Chemical Society*, 2006. 128(4): p. 1390-1393.

While some issues have been investigated, several challenges remain to be addressed for lithium-oxygen batteries. These challenges include limiting dendrite formation at the lithium metal surface, protecting the lithium metal (and possibly other materials) from moisture and other potentially harmful components of air (if the oxygen is obtained from the air), designing a system that achieves acceptable specific energy and specific power levels, reducing the hysteresis between the charge and discharge voltages (which limits the round-trip energy efficiency), morphology changes in the metal upon extended cycling that result in a large overall volume change in the cell, changes in the structure and composition of the passivating layer that forms at the surface of the metal when exposed to certain electrolytes, which may isolate some metal and/or increase the resistance of the cell over time. Many of the foregoing are significant hurdles in improving the number of cycles over which the system can be cycled reversibly.

The limit of round trip efficiency occurs due to an apparent voltage hysteresis as depicted in FIG. 4. In FIG. 4, the discharge voltage 70 (approximately 2.5 to 3 V vs. Li/Li$^+$) is much lower than the charge voltage 72 (approximately 4 to 4.5 V vs. Li/Li$^+$). The equilibrium voltage 74 (or open-circuit potential) of the lithium/oxygen system is approximately 3 V. Hence, the voltage hysteresis is not only large, but also very asymmetric.

The large over-potential during charge may be due to a number of causes. For example, reaction between the Li$_2$O$_2$ and the conducting matrix 62 may form an insulating film between the two materials. Additionally, there may be poor contact between the solid discharge products Li$_2$O$_2$ or Li$_2$O and the electronically conducting matrix 62 of the positive electrode 54. Poor contact may result from oxidation of the discharge product directly adjacent to the conducting matrix 62 during charge, leaving a gap between the solid discharge product and the matrix 52.

Another mechanism resulting in poor contact between the solid discharge product and the matrix 62 is complete disconnection of the solid discharge product from the conducting matrix 62. Complete disconnection of the solid discharge product from the conducting matrix 62 may result from fracturing, flaking, or movement of solid discharge product particles due to mechanical stresses that are generated during charge/discharge of the cell. Complete disconnection may contribute to the capacity decay observed for most lithium/oxygen cells. By way of example, FIG. 5 depicts the discharge capacity of a typical Li/oxygen cell over a period of charge/discharge cycles.

Other physical processes which cause voltage drops within an electrochemical cell, and thereby lower energy efficiency and power output, include mass-transfer limitations at high current densities. The transport properties of aqueous electrolytes are typically better than nonaqueous electrolytes, but in each case mass-transport effects can limit the thickness of the various regions within the cell, including the cathode. Reactions among O$_2$ and other metals may also be carried out in various media.

What is needed therefore is a metal/oxygen battery that exhibits improved hysteresis.

SUMMARY

In one embodiment, a metal/oxygen electrochemical cell includes a negative electrode, a separator positioned adjacent to the negative electrode, a positive electrode spaced apart from the negative electrode by the separator, the positive electrode including a porous electrically conductive material portion, the porous electrically conductive material portion coated with a conformally coated protective layer, and an electrolyte within the porous electrically conductive material portion.

In another embodiment, a method of forming a metal/oxygen electrochemical cell includes providing a porous electrically conductive material portion, conformally coating the porous electrically conductive material portion with a protective layer, providing a separator next to the positive electrode, providing a negative electrode next to the separator and spaced apart from the conformally coated porous electrically conductive material portion, and filling the conformally coated porous electrically conductive material portion with an electrolyte.

DETAILED DESCRIPTION

Figure 1:
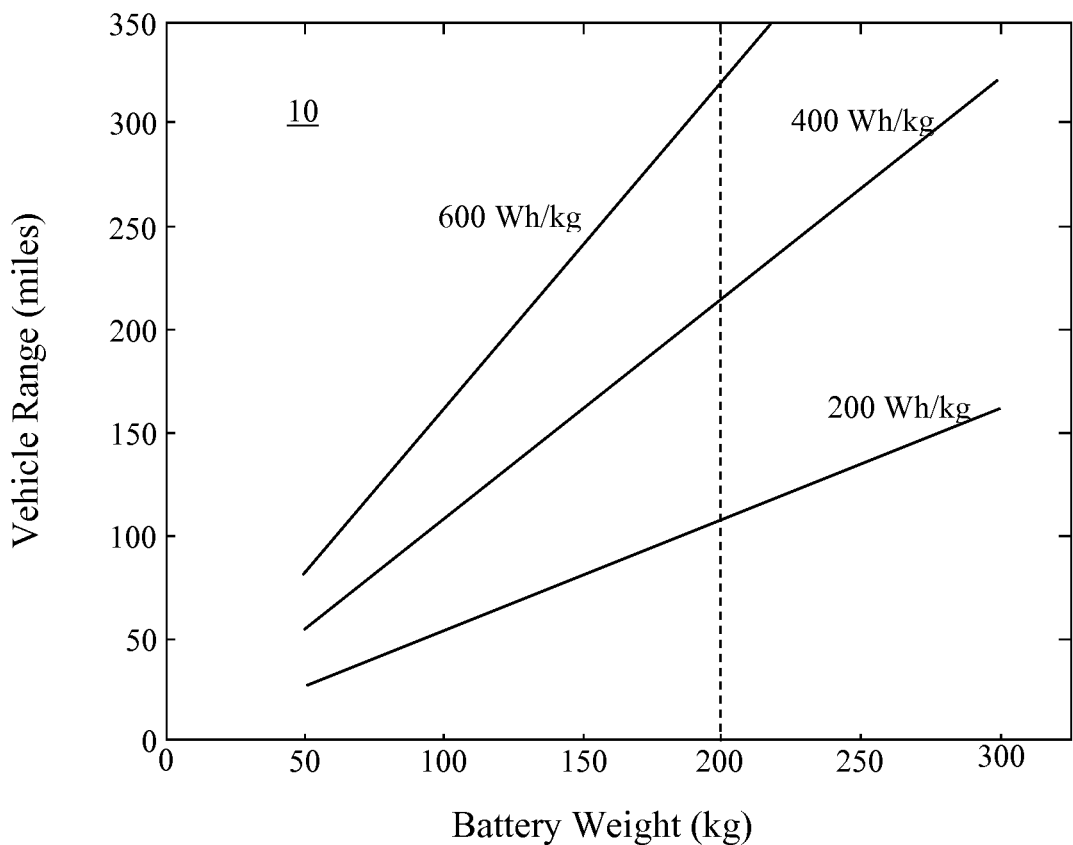
FIG. 1 depicts a plot showing the relationship between battery weight and vehicular range for various specific energies.
Figure 2:
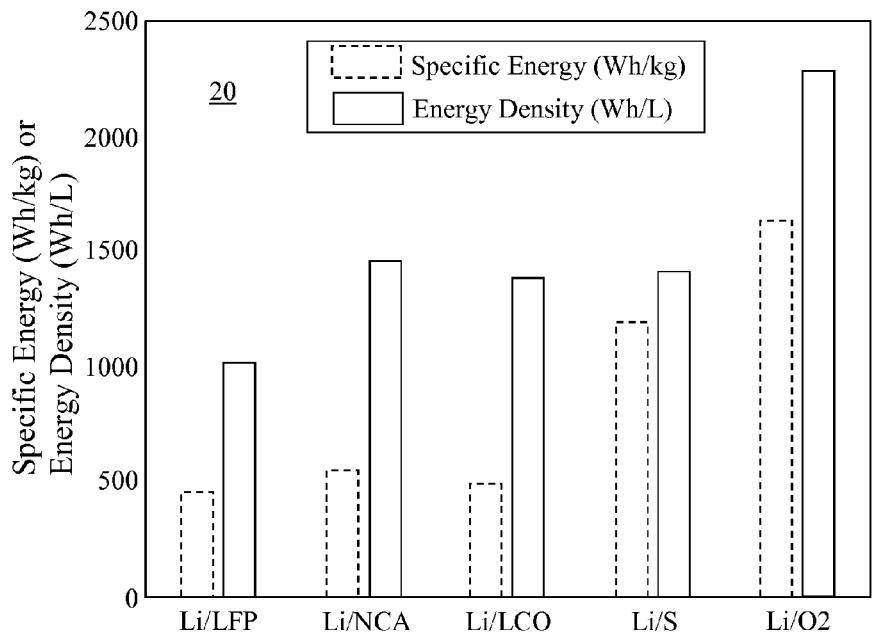
FIG. 2 depicts a chart of the specific energy and energy density of various lithium-based cells.
Figure 3:
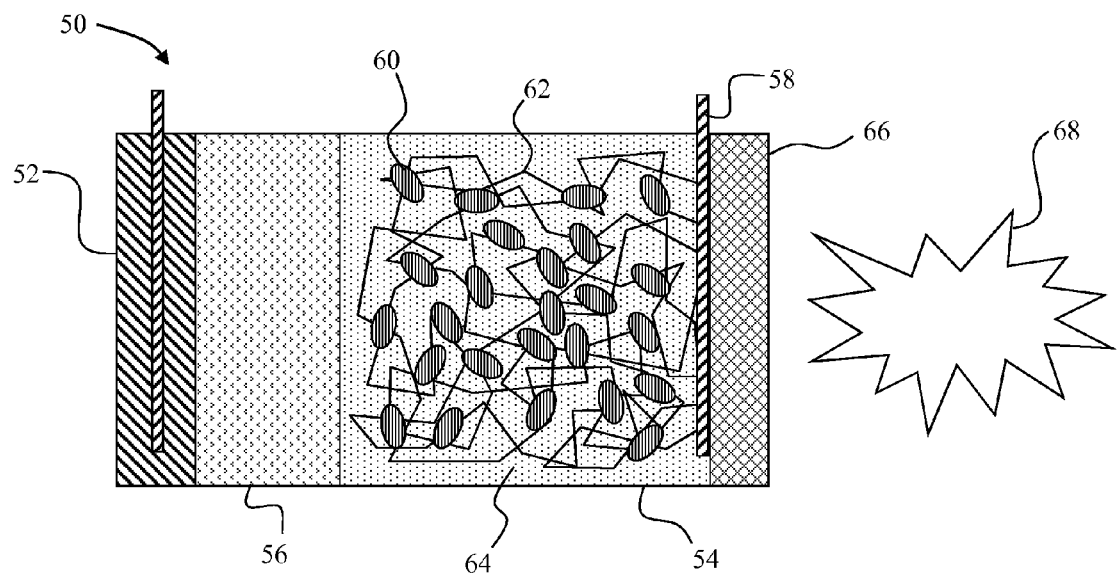
FIG. 3 depicts a prior art lithium-oxygen (Li/oxygen) cell including two electrodes, a separator, and an electrolyte.
Figure 4:
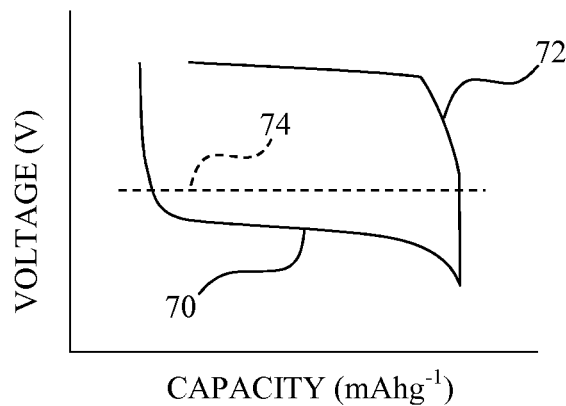
FIG. 4 depicts a discharge and charge curve for a typical Li/oxygen electrochemical cell.
Figure 5:
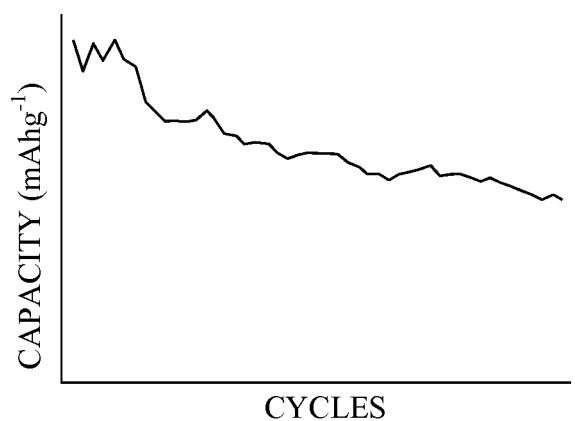
FIG. 5 depicts a plot showing decay of the discharge capacity for a typical Li/oxygen electrochemical cell over a number of cycles.
Figure 6:
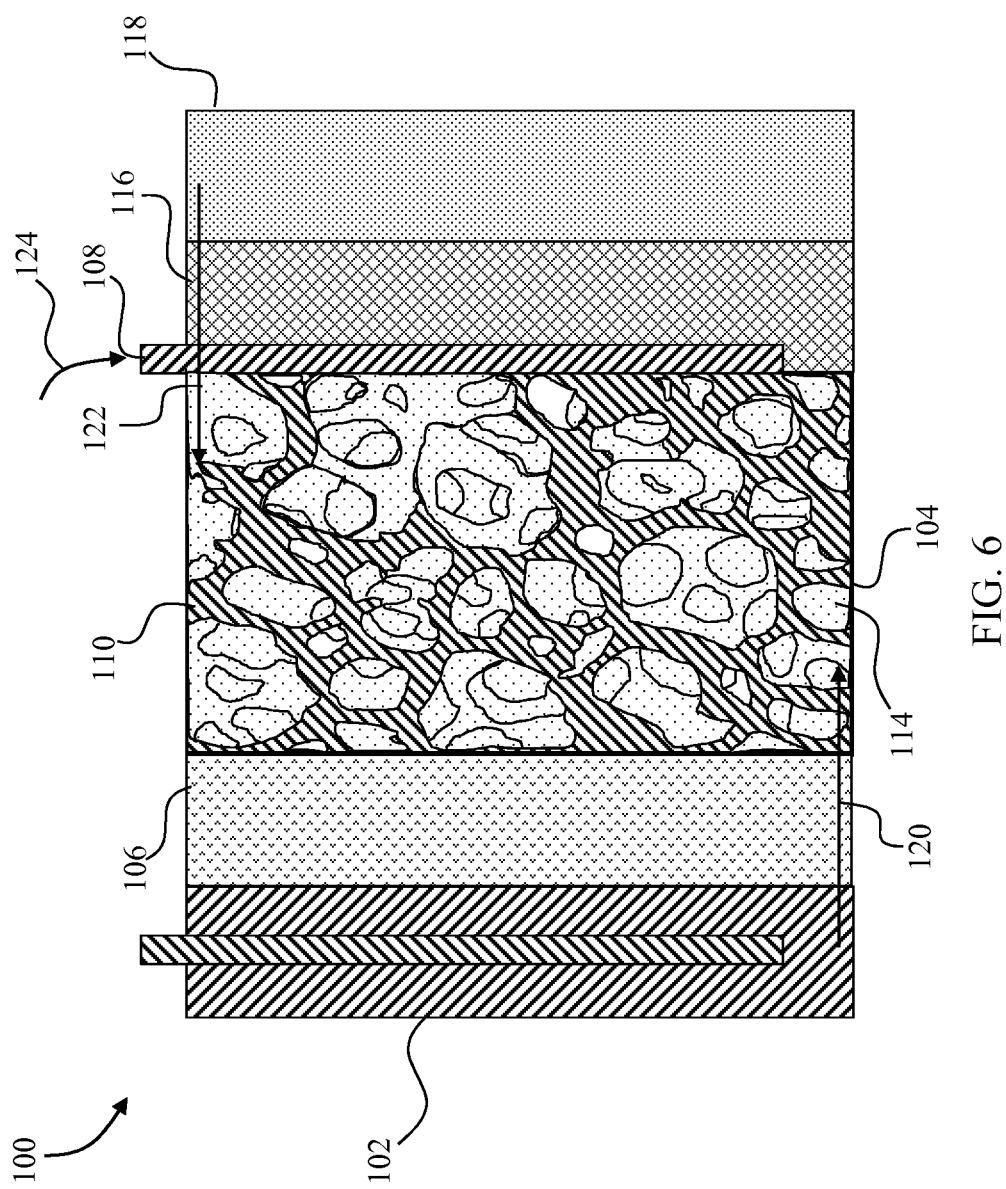
FIG. 6 depicts a schematic view of a lithium-oxygen (Li/oxygen) cell with two electrodes, one of which is configured to control the distribution of oxygen and electrolyte within the electrode, in a fully charged state.

A schematic of an electrochemical cell 100 is shown in FIG. 6. The electrochemical cell 100 includes a negative electrode 102 separated from a positive electrode 104 by a porous separator 106. The negative electrode 102 may be formed from lithium metal or a lithium-insertion compound (e.g., graphite, silicon, tin, LiAl, LiMg, $Li_4Ti_5O_{12}$), although Li metal affords the highest specific energy on a cell level compared to other candidate negative electrodes. Other metals may also be used to form the negative electrode, such as Zn, Mg, Na, Fe, Al, Ca, Si, and others.

The positive electrode 104 in this embodiment includes a current collector 108 and a porous electrically conductive material 110. The separator 106 prevents the negative electrode 102 from electrically connecting with the positive electrode 104.

The electrochemical cell 100 includes an electrolyte solution 114 present in the positive electrode 104 and in some embodiments in the separator 106. In the exemplary embodiment of FIG. 6, the electrolyte solution 114 includes a salt, $LiPF_6$ (lithium hexafluorophosphate), dissolved in an organic solvent mixture. The organic solvent mixture may be any desired solvent. In certain embodiments, the solvent may be dimethyl ether (DME), acetonitrile (MeCN), ethylene carbonate, or diethyl carbonate.

A barrier 116 separates the positive electrode 104 from a reservoir b 118. The reservoir 118 may be any vessel suitable to hold oxygen supplied to and emitted by the positive electrode 104 or even the atmosphere. While the reservoir 118 is shown as an integral member of the electrochemical cell 100 attached to the positive electrode 104, in one embodiment the reservoir 118 is the positive electrode 104 itself. Various embodiments of the reservoir 118 are envisioned, including rigid tanks, inflatable bladders, and the like. In FIG. 6, the barrier 116 is a mesh which permits oxygen and other gases to flow between the positive electrode 104 and the reservoir 118 while also preventing the electrolyte 114 from leaving the positive electrode 104. Alternatively, the retention of cell components such as volatile electrolyte may be carried out separately from the individual cells, such that the barrier 116 is not required.

In the case in which the metal is Li, the electrochemical cell 100 discharges with lithium metal in the negative electrode 102 ionizing into a $Li^+$ ion with a free electron $e^-$. $Li^+$ ions travel through the separator 106 in the direction indicated by arrow 120 toward the positive electrode 104. Additionally, oxygen is supplied from the reservoir 118 through the barrier 116 as indicated by the arrow 122. Therefore, free electrons $e^-$ flow into the positive electrode 104 through the current collector 108 as indicated by arrow 124.

Figure 7:
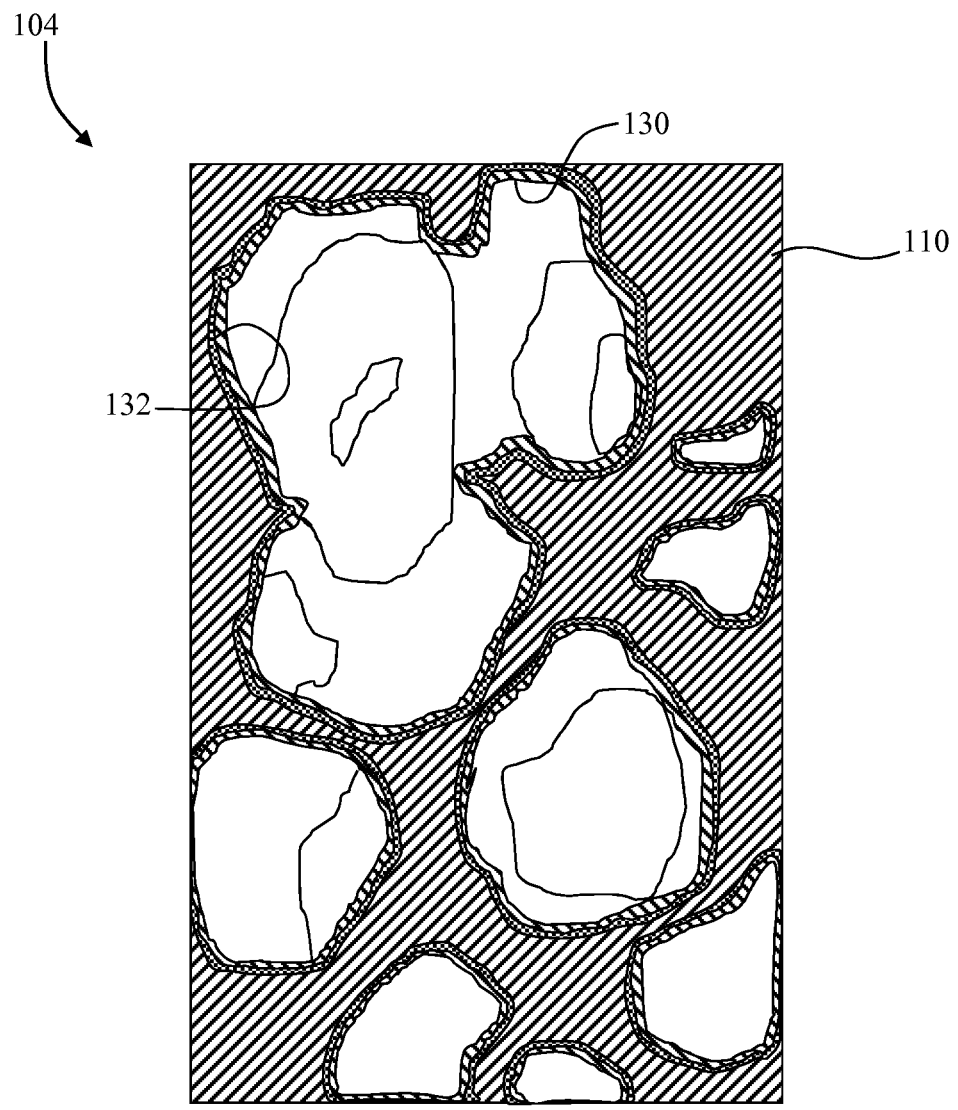
FIG. 7 depicts a schematic view of a portion of the porous electrode of FIG. 6.

The oxygen atoms and $Li^+$ ions within the positive electrode 104 form a discharge product 130 (see FIG. 7) inside the positive electrode 104. As seen in the following equations, during the discharge process metallic lithium is ionized, combining with oxygen and free electrons to form $Li_2O_2$ or $Li_2O$ discharge product that may coat the surfaces of the electrically conductive framework 110.

$$Li \rightarrow Li^+ + e^- \text{ (negative electrode)}$$

$$\frac{1}{2}O_2 + 2Li^+ + 2e^- \xrightarrow{catalyst} Li_2O \text{ (positive electrode)}$$

$$O_2 + 2Li^+ + 2e^- \xrightarrow{catalyst} Li_2O_2 \text{ (positive electrode)}$$

The discharge product 130 is deposited on a protective layer 132 formed on the porous electrically conductive material 110. The protective layer 132 in various embodiments is $TiO_2$, $Al_2O_3$, ZnO, $SiO_2$, $In_2O_3$, $ZrO_2$, or another desired oxide. Because the protective layer 132 is an oxide, it is resistant to reactions with oxidative species in the cell, such as $Li_2O_2$, that is formed during discharge. In another embodiment, the protective layer 132 is Silicon Carbide (SiC). The protective layer 132 coats the porous electrically conductive material 110 completely but is very thin (a few atomic layers), in order to allow electronic transport across it so that the redox reaction can take place at the cathode surface.

In one embodiment, the atomically thin protective layer 132 is deposited by a technique called atomic layer deposition (ALD). In other embodiments, a different conformal coating technique is used, such as, molecular beam epitaxy, chemical vapor deposition, and sputtering. Atomic layer deposition (ALD) is a well-known deposition technique by which one can deposit materials by exposing a substrate to several different precursors sequentially. As used herein, the tem "deposition cycle" means a cycle wherein a substrate is exposed to a precursor "A" which reacts with the porous electrically conductive material 110 until saturation, then the porous electrically conductive material 110 is exposed to a precursor "B" which reacts with the porous electrically conductive material 110 until saturation. Each deposition cycle results, ideally, in one atomic layer. The final thickness is controlled by the number of cycles a porous electrically conductive material 110 is exposed to. Typically, the precursors include an organometallic precursor and an oxidizing agent such as water vapor or ozone.

The porous electrically conductive material 110 in various embodiments is an inert metal foam or a porous conducting oxide. In one embodiment, the porous electrically conductive material 110 is a porous electronically conductive carbon material. The thin protective layer 132 prevents a parasitic reaction that involves carbon conductive additives in the cathode. The thin protective layer 132 is sufficiently thin to allow for electron transfer through the thin protective layer 132 to the porous electrically conductive material 110.

While the invention has been illustrated and described in detail in the drawings and foregoing description, the same should be considered as illustrative and not restrictive in character. Only the preferred embodiments have been presented and all changes, modifications and further applications that come within the spirit of the invention are desired to be protected.

The invention claimed is:

1. A metal/oxygen electrochemical cell, comprising:
a negative electrode;
a separator positioned adjacent to the negative electrode;
a positive electrode spaced apart from the negative electrode by the separator, the positive electrode including a porous electrically conductive framework, the porous electrically conductive framework coated with a conformally coated protective layer; and an electrolyte within the porous electrically conductive framework, wherein the conformally coated protective layer comprises a material selected from the group consisting of SiC, $TiO_2$, $Al_2O_3$, ZnO, $SiO_2$, $In_2O_3$, and $ZrO_2$.

2. The metal/oxygen electrochemical cell of claim 1, wherein the negative electrode comprises a form of lithium.

3. The metal/oxygen electrochemical cell of claim 1, wherein the oxide protective layer is formed using atomic layer deposition.

4. The metal/oxygen electrochemical cell of claim 1, wherein the oxide protective layer is formed using molecular beam epitaxy.

5. The metal/oxygen electrochemical cell of claim 1, wherein the oxide protective layer is formed using chemical vapor deposition.

6. The metal/oxygen electrochemical cell of claim 1, wherein the electrically conductive framework extends from a current collector to the separator.

7. The metal/oxygen electrochemical cell of claim 1, wherein the porous electrically conductive framework comprises:
an inert metal foam.

8. A method of forming a metal/oxygen electrochemical cell, comprising:
providing a porous electrically conductive framework;
conformally coating the porous electrically conductive framework with a protective layer comprising a material selected from the group consisting of SiC, $TiO_2$, $Al_2O_3$, ZnO, $SiO_2$, $In_2O_3$, and $ZrO_2$;
providing a separator next to the positive electrode;
providing a negative electrode next to the separator and spaced apart from the conformally coated porous electrically conductive framework; and
filling the conformally coated porous electrically conductive framework with an electrolyte.

9. The method of claim 8, wherein providing the negative electrode comprises providing a form of lithium in the negative electrode.

10. The method of claim 8, wherein conformally coating the porous electrically conductive framework with an oxide protective layer comprises:
forming the oxide protective layer using atomic layer deposition.

11. The method of claim 8, wherein conformally coating the porous electrically conductive framework with an oxide protective layer comprises:
forming the oxide protective layer using molecular beam epitaxy.

12. The method of claim 8, wherein conformally coating the porous electrically conductive framework with an oxide protective layer comprises:
forming the oxide protective layer using chemical vapor deposition.

13. The method of claim 8, wherein providing a porous electrically conductive framework comprises:
providing an inert metal foam.

14. The method of claim 8, further comprising:
providing a current collector in electrical communication with the porous electrically conductive framework, wherein providing a separator comprises:
positioning the separator next to the positive electrode such that the electrically conductive framework extends from the current collector to the separator.

* * * * *